US011097452B2

(12) United States Patent
Lincoln et al.

(10) Patent No.: US 11,097,452 B2
(45) Date of Patent: Aug. 24, 2021

(54) RESILIENT CORES WITH CONVECTION BARRIERS PARTICULARLY FOR INFLATABLE BODIES

(75) Inventors: John Lincoln, Vashon Island, WA (US); Douglas Jacot, Kingston, WA (US); Jay Gutka, Renton, WA (US); Brandon Bowers, Burien, WA (US); James Marson, Seattle, WA (US)

(73) Assignee: Cascade Designs, Inc., Seattle, WA (US)

( * ) Notice: Subject to any disclaimer, the term of this patent is extended or adjusted under 35 U.S.C. 154(b) by 0 days.

(21) Appl. No.: 13/181,420

(22) Filed: Jul. 12, 2011

(65) Prior Publication Data

US 2011/0311765 A1 Dec. 22, 2011

Related U.S. Application Data

(63) Continuation of application No. PCT/US2009/000206, filed on Jan. 12, 2009.
(Continued)

(51) Int. Cl.
*B32B 3/10* (2006.01)
*B32B 3/24* (2006.01)
(Continued)

(52) U.S. Cl.
CPC ............ *B29C 43/02* (2013.01); *A47C 27/088* (2013.01); *A47C 27/142* (2013.01);
(Continued)

(58) Field of Classification Search
CPC ........ A47C 27/142–144; A47C 27/146; A47C 27/15
(Continued)

(56) References Cited

U.S. PATENT DOCUMENTS 2,835,313 A * 5/1958 Dodge .............................. 5/740
3,866,252 A * 2/1975 Rogers, Jr. ........... A47C 27/088
5/655.9
(Continued)

FOREIGN PATENT DOCUMENTS

AU 689027 B 3/1998
DE 9700283 A1 7/1998
(Continued)

OTHER PUBLICATIONS

International Search Report and Written Opinion for PCT Application No. PCT/US2009/000206, Applicants: Cascade Designs, Inc. et al., dated Jun. 26, 2009, 7 pages.
(Continued)

*Primary Examiner* — Joanna Pleszczynska
(74) *Attorney, Agent, or Firm* — P G Scott Born; Foster Garvey PC

(57) ABSTRACT

Resilient cores preferably for inflatable bodies having resilient slabs that define a plurality of generally columnar holes or resilient arrays of generally columnar solids, methods for making such slabs and arrays, and articles incorporating the same wherein the cores further includes thermal transmission mitigation means for improving a core's resistance to heat transfer beyond the core's innate insulative properties. Non-exclusive and non-exhaustive examples of such thermal transmission mitigation means in slab core embodiments include consideration to hole or bore geometric cross section, frequency, pattern and orientation, the introduction of a thermal barrier at or within at least some holes or bores, and/or slab material selection/treatment. Non-exclusive and non-exhaustive examples of such thermal transmission mitigation means in array core embodiments include consideration to the geometric cross section, frequency (density), pattern and orientation of the solids, the introduction of
(Continued)

thermal barriers within inter-solid spaces and/or solid material selection/treatment.

7 Claims, 8 Drawing Sheets

Related U.S. Application Data

(60) Provisional application No. 61/010,846, filed on Jan. 10, 2008.

(51) Int. Cl.
| | |
|---|---|
| *B32B 3/26* | (2006.01) |
| *A47C 27/08* | (2006.01) |
| *A47C 27/14* | (2006.01) |
| *A47C 27/15* | (2006.01) |
| *B29C 43/02* | (2006.01) |
| *B68G 5/02* | (2006.01) |
| *B29C 69/00* | (2006.01) |
| *B26D 7/14* | (2006.01) |
| *B29K 105/04* | (2006.01) |
| *B29L 31/00* | (2006.01) |

(52) U.S. Cl.
CPC ............. *B29C 69/001* (2013.01); *B68G 5/02* (2013.01); *A47C 27/144* (2013.01); *B26D 7/14* (2013.01); *B29K 2105/04* (2013.01); *B29L 2031/751* (2013.01); *Y10T 428/24273* (2015.01)

(58) Field of Classification Search
USPC ...... 428/131, 137, 138; 5/652.1, 655.9, 724, 5/727, 729, 740
See application file for complete search history.

(56) References Cited

U.S. PATENT DOCUMENTS

| | | | |
|---|---|---|---|
| 5,226,188 A | 7/1993 | Liou | |
| 5,705,252 A * | 1/1998 | Lea et al. | ...................... 428/133 |
| 2003/0217414 A1* | 11/2003 | Marson | ............................. 5/709 |
| 2006/0288492 A1* | 12/2006 | Robins | ................. A47C 27/144 |
| | | | 5/740 |

FOREIGN PATENT DOCUMENTS

| | | | |
|---|---|---|---|
| EP | 2030533 A2 | 3/2009 | |
| FR | 1150053 A | 1/1958 | |
| GB | 544182 A | 3/1941 | |
| JP | 07-265177 A | 10/1995 | |
| JP | 2007-135671 A | 6/2007 | |
| KR | 20-0293298 Y1 | 10/2002 | |
| KR | 0325036 Y1 | 9/2003 | |
| KR | 10-2007-0026934 A | 3/2007 | |

OTHER PUBLICATIONS

Examination Report for Australian Application No. 2016238833, Applicant: Cascade Designs, Inc., dated Apr. 7, 2017, 6 pages.
Office Action for Canadian Application No. 2,711,821, Applicant: Cascade Designs, Inc., dated Jul. 6, 2015, 8 pages.
Office Action for Chinese Application No. 200980109138.2, Applicant: Cascade Designs, Inc., dated Sep. 25, 2014, 12 pages.

* cited by examiner

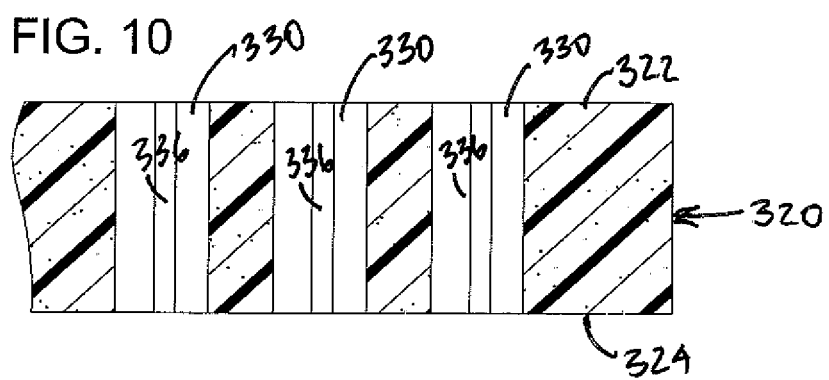
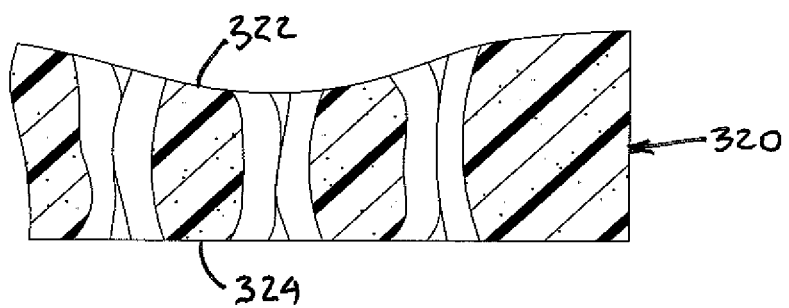

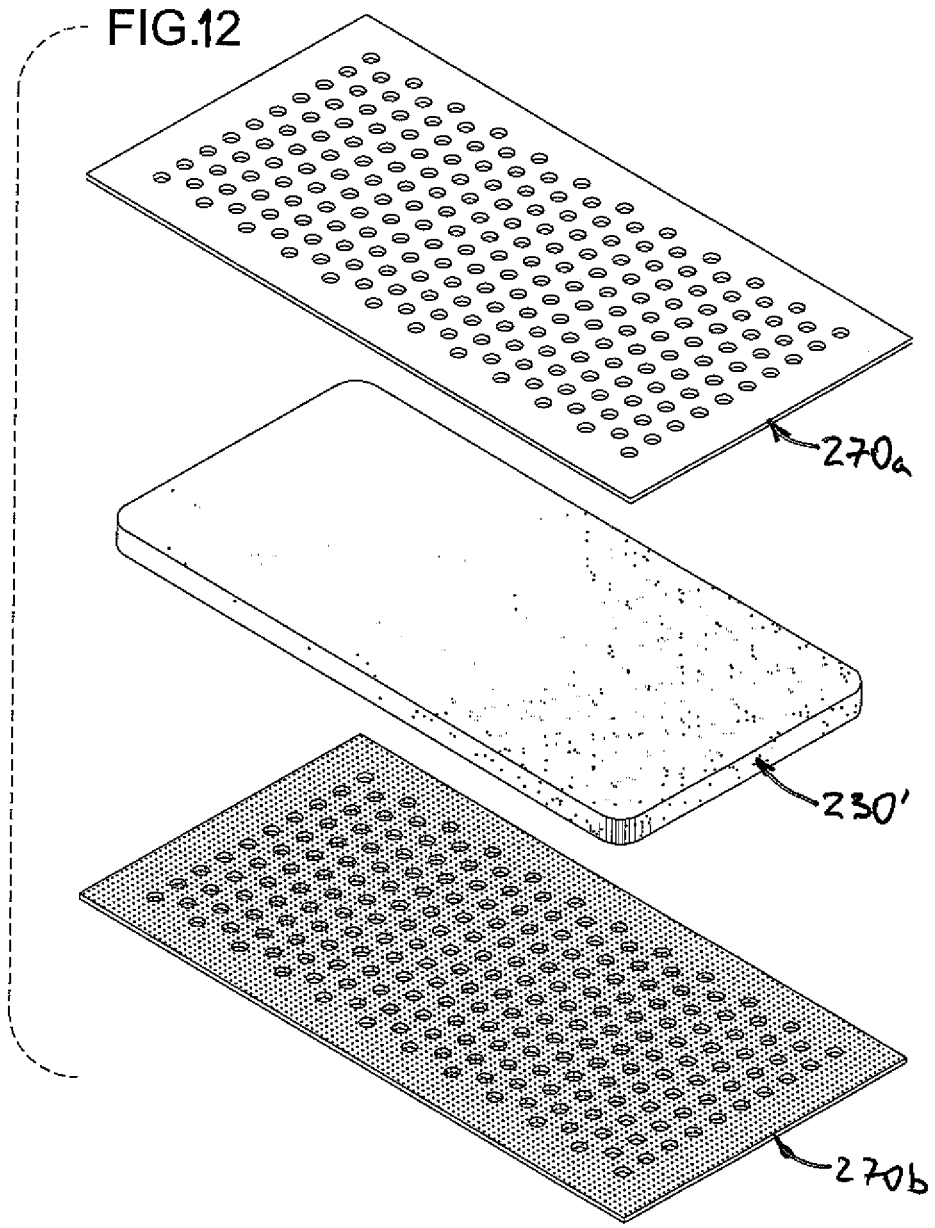

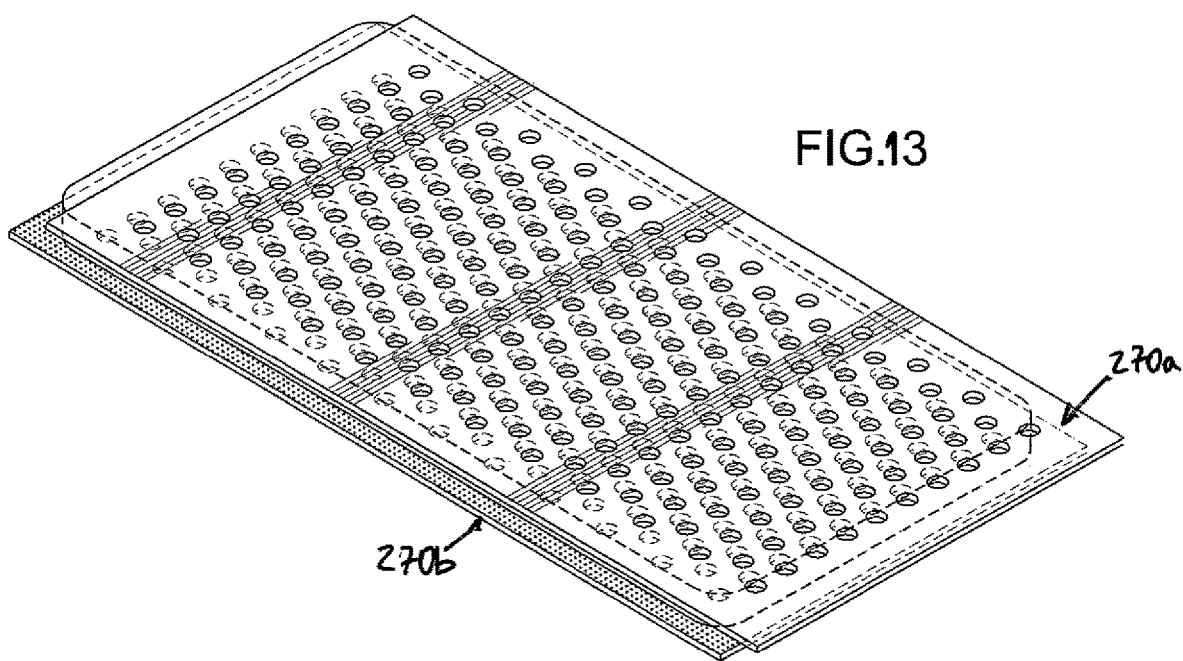

RESILIENT CORES WITH CONVECTION BARRIERS PARTICULARLY FOR INFLATABLE BODIES

BACKGROUND OF THE INVENTION

Since the introduction of the original "Therm-A-Rest" self-inflating mattress pad in 1971, many improvements regarding the manufacturing and resulting product have been recognized. These improvements have included modifications to production methodologies, product durability, product flexibility, and thermal performance. One goal in particular has been the reduction in the pad's weight without loss of thermal insulation performance.

In 1994, Cascade Designs, Inc. (hereinafter "Cascade") developed a cored mattress pad that could provide a desired level of loft, but included an open cell core of foam material that had a plurality of laterally extending hollow cylinders. These transverse cylinders did not affect the bonding surfaces of the core with the enveloping sheets, but otherwise reduced the overall density of the foam core, and therefore the weight of the resulting mattress pad. However, manufacturing and performance issues, as well as the requirement for a relatively thick original core limited the range of applications for this technology.

In 1995, Cascade introduced the "UltraLite" series mattress pads. These pads were the first to utilize vertically oriented voids (i.e., orthogonal to the major surface of the core), although these voids were not the result of a material removal process. For additional information regarding this technology, please see U.S. Pat. No. 5,705,252, which is incorporated herein by reference.

A significant benefit regarding the technology used in the UltraLite series mattress pads was its ability to establish macro voids (as opposed to the open cellular construction of the expanded foam material, which constitutes micro voids) regardless of core thickness. By orienting the longitudinal axis of the voids in the vertical direction, significant density reduction of the resilient core/slab could be obtained in a relatively thin sectional thickness slab; by selectively establishing the geometry of the voids, the frequency of the voids and their overall pattern, otherwise undesirable performance characteristics of the pad could be minimized.

While the UltraLite core represented a major advance in lightweight core technology, it did result in a core having certain manufacturing disadvantages (e.g., because the voids were formed from displaced slits, and such slits usually were similarly oriented, stability of the core would be compromised in the direction perpendicular to the displacement bias). In addition, it was recognized that the vertically oriented voids provided a convenient convection and radiant heat transmission path, thereby compromising the thermal performance of the mattress pad. It was with this recognized thermal deficiency that the UltraLite core contemplated vertical voids that could buckle or collapse upon compression loading. However, creating voids susceptible to such compression buckling also compromised other performance features of the pad, such as core-to-fabric bonding characteristics and vertical support characteristics.

It thus became apparent that voids extending from the bottom to the top of a resilient core could provide a desired reduction in core weight through macro density modification without requiring a sectionally thick core. Moreover, conventional coring techniques, such as die cutting, albeit with material waste, could be used, thereby permitting use of various geometric forms to reduce slab instability that otherwise may result from the density reducing actions. However, thermal transmission mitigation means were needed in order to retain desired performance of pads incorporating such cores.

SUMMARY OF THE INVENTION

The invention is directed to resilient cores preferably for inflatable bodies comprising resilient slabs that define a plurality of generally columnar holes or resilient arrays of generally columnar solids, methods for making such slabs and arrays, and articles incorporating the same wherein the cores further comprise thermal transmission mitigation means for improving a core's resistance to heat transfer beyond the core's innate insulative properties. Non-exclusive and non-exhaustive examples of such thermal transmission mitigation means in slab core embodiments include consideration to hole or bore geometric cross section, frequency, pattern and orientation, the introduction of a thermal barrier at or within at least some holes or bores, and/or slab material selection/treatment. Non-exclusive and non-exhaustive examples of such thermal transmission mitigation means in array core embodiments include consideration to the geometric cross section, frequency (density), pattern and orientation of the solids, the introduction of thermal barriers within inter-solid spaces and/or solid material selection/treatment.

As used herein, "slab" with respect to cores, its plural and equivalents comprises a mechanically unitary structure whether derived from a single element or multiple elements, and having a first major surface in general opposing relationship to a second major surface, with a common perimeter surface joining the two major surfaces; "array" with respect to cores, its plural and equivalents comprises an aggregate structure having a plurality of generally columnar solids. "Thermal transmission mitigation means" comprises intrinsic material (a material composition derived from the slab or array solids, or derived from material that is substantially the same as the slab or array solids material) or extrinsic material (a material composition that is not substantially the same as the slab or array solids material) that is integrated with or into the slab or array solids, or constitutes a treatment to the slab or array solids wherein when the core is subjected to opposing compressive force in a direction perpendicular to the first and second major surfaces, a decrease in thermal transfer rate results through at least a portion of the slab or array that is subject to such compression. In addition to the foregoing, the geometric cross section, orientation, frequency, or pattern of holes or bores defined by a slab core or the solids of an array may be homogeneous or heterogeneous.

Slab core embodiments of the invention may comprise one slab of resilient material such as expanded foam (preferably urethane) or a plurality of sub-slabs mechanically linked to each other, as will be described in greater detail below. Unless otherwise modified by way of material treatment, single slab core embodiments are generally homogeneous while multi-sub-slab core embodiments may be either homogeneous or heterogeneous. The same is true with respect to array core embodiments of the invention: one, some or all solids may comprise a single element of resilient material or a plurality of materials mechanically linked to each other. Moreover, the interface between sub-slabs (or array material elements) may be planar or irregular, and oriented in any desired direction, e.g., perpendicular, oblique or parallel to at least one major surface of a slab core embodiment for planar interfaces.

As noted earlier, slab embodiments of the invention may comprise a homogeneous slab, or a heterogeneous slab. A homogeneous slab comprises one that is formed from a singular material having a generally consistent average Indentation Force Deflection ("IFD") value throughout its volume, regardless of the number of portions, elements, orientations or zones comprising the slab, i.e., the composition of the slab is not determinative of its characterization. A heterogeneous slab comprises one that has a plurality of zones, each zone having an IFD value different from an adjacent zone, regardless of the number of portions, elements or zones comprising the slab. A heterogeneous single slab may comprise multiple IFD zones and/or multiple sub-slabs may comprise a corresponding number of IFD zones. In either homogeneous or heterogeneous slab embodiments, multiple sub-slabs and/or elements are associated (e.g., bonded, welded) with each other to form a mechanical link there between. Orientation of such associations (e.g., stacked, adjacent, fitted, spliced, etc.) is not a material constraint of these definitions under most circumstances.

In homogeneous slab embodiments, the slab is characterized as having a generally consistent average IDF value prior to physical manipulation, such as the creation of holes or contours therein. In such embodiments, therefore, the slab material's otherwise uniform IFD values may be affected by physical manipulation such as the frequency, placement and/or geometric configuration of the holes, as well as modifications made to the sectional thickness thereof such as through shaping. However, the fundamental constitution of the slab remains constant. Slabs comprising at least a pair (a plurality) of sub-slabs with generally identical IFD values are included in this class of embodiments, even if the resulting association modifies the resulting core's IFD values in certain portions thereof. However, slabs wherein such sub-slabs are associated and which purposely exploit the association to modify the slab's IFD values for specific reasons are not included in this class of embodiments, e.g., an adhesive is used to associate two sub-slabs and the adhesive cures into a rigid interface whose properties are intended to affect the slab's IFD values for intended purposes.

In heterogeneous slab embodiments, factors other than those applicable to homogeneous slab exist to modify the IFD values thereof. Those factors include, but are not limited to, associating at least a pair of sub-slabs having intrinsically differing IFD values (or associating similar IFD sub-slabs wherein the mode or means for association materially and purposefully alters the resulting slab's IFD values as referenced immediately above); associating at least a pair of sub-slabs having unique IFD values due to the frequency, placement and/or geometric configuration of holes, or modifications made to the sectional thickness thereof such as through shaping; and/or using a single slab having intrinsically variable IFD values such as through incorporation of different materials, including a fluid filled reservoir, within the slab.

As noted previously, array embodiments of the invention comprise a plurality of generally columnar solids. The generally columnar solids, which may be arranged in regular and/or irregular patterns, or randomly, include a first portion and a generally opposed second portion, each of which may be separate surfaces or different portions of the same surface. They are arranged such that the aggregate first surfaces generally approximate a first plane and the second surfaces generally approximate a second plane. Conceptually then, the first plane corresponds to the first major surface of a slab embodiment, and the second plane corresponds to the second major surface thereof. In one series of embodiments, the major axes of at least some of the columns are generally perpendicular to the virtual first and/or second planes. These types of columns are referred to herein as "normal columns". In another series of embodiments, the major axes of at least some columns are generally not perpendicular to the virtual first and/or second planes. These are referred to herein as "oblique columns".

With respect to slab core embodiments of the invention and as disclosed above, a plurality of holes or bores are defined by the slab (unless otherwise indicated or obvious from the context of usage, the term "slab" will hereinafter refer to single or multiple sub-slabs whether homogeneous or heterogeneous). The axes of holes perpendicular to the first major surface of the slab, perpendicular to the second major surface of the slab, or perpendicular to both major surfaces are referred to as "normal holes/bores". The axes of the holes/bores may also be acute to the first and/or second major surfaces. In other words, the point of hole axis intercept with the first major surface is not in direct opposition to the point of hole axis intercept with the second major surface. Generally, such holes or bores are referred to as "oblique holes/bores". In addition to axis orientation, the holes/bores defined by a slab core include a geometric cross section, frequency and pattern. As will be described in detail below, the geometric cross section may be exploited as a form of thermal transmission mitigation means. Parameters concerning frequency and pattern also core density, performance, insulation value distribution and other factors that will also be described in detail below.

With respect to oblique hole/bore embodiments of the invention, such holes/bores are divided for purposes of discussion into two species: "open" and "occluded". Open holes/bores are those that have not physical impediments to matter transit from one hole/bore orifice to the other in a direction orthogonal to the first or second major surface (which ever is gravitationally closer to the earth's surface); occluded holes/bore are those that do have a physical impediment to matter transit in a direction orthogonal to the first or second major surface (both hole specie are open in the sense of having a through passage from one orifice to the other, but when viewed in section and along a direction orthogonal to the gravitationally lower major surface, open embodiments will have a non-occluded passage while occluded embodiments have such an orientation/geometry that orthogonal matter transit will necessarily impinge upon a hole/bore wall prior to exiting from an opposing orifice).

Thermal transmission mitigation generally comprises means of varying effectiveness to mitigate conductive, convective and/or radiant thermal transfer. Because conductive thermal transfer is not a major mode of heat transfer in embodiments of the invention due to the presence of the core separating opposing major surfaces, focus is made with respect to convective and radiant means for thermal transmission mitigation.

A principle means for creating a convection thermal barrier is to interrupt fluid/gas movement or currents within a volume, as is well known. Core embodiments of the invention comprise holes/bores in slab cores and/or inter-solid spaces in array cores. Thus, in addition to factors concerning thermal permeability of the core, the holes/bores and spaces provide a particularly important conduit for heat transfer from one "surface" of the core to the opposing surface. Similarly, the holes/bores and spaces within a core can become the primary conduit for radiant heat transfer. Thus, placement of suitable thermal transmission mitigation means in the holes/bores and/or spaces or at one or both orifices of a hole/bore represents an effective mode for achieving the stated objective of the thermal transmission mitigation means.

Turning first then to the normal or perpendicular hole/bore slab core embodiments of the invention, it is desirable to provide some form of thermal mitigation means at an orifice of, and/or in, at least some of the holes/bores to reduce at least convective thermal transfer there through, and preferably also radiant thermal transfer. Thus, these embodiments will preferable include a discrete plug member disposed in at least some of the holes/bores, and/or will preferably have a thermal barrier such as a sheet material at one or both major surfaces to occlude at least some of the open holes/bores. Where at least two sub-slabs comprise the slab, the thermal transmission mitigation means may also be disposed at the interface between sub-slabs, and is preferably a sheet material.

Open oblique holes/bores in slab core embodiments of the invention similarly benefit from the thermal transmission mitigation means applicable to open normal holes/bores. However, the benefits obtained by providing separate thermal transmission mitigation means for normal or open oblique holes/bores are not as significant when oblique occluded holes/bores are involved. Because convective thermal transfer generally occurs in a direction that is congruent, but opposite in direction, to gravitational acceleration, at least a portion of the slab core functions to mitigate thermal transmission (since a body supporting mat supporting surface is usually (or at least preferably) orthogonal to such directions, providing for a hole/bore that is occluded in this direction inherently provides a convection mitigation means, although additional insulation may be desired). Thus, the treatment of a slab core to define at least one oblique occluded hole/bore itself constitutes a form of thermal transmission mitigation means for improving a core's resistance to heat transmission beyond its innate insulative properties.

A benefit realized from the incorporation of oblique holes/bores (whether open or occluded) is that they are more susceptible to orthogonally oriented compression deformation (buckling/collapsing due to application of compressive forces in a direction that is perpendicular to at least one major surface) than holes/bores having similar geometric cross section that are considered "normal" to at least one major surface. During compression buckling/collapsing of an oblique hole/bore, it necessarily becomes occluded or more occluded. Consequently, the insulative property of such a slab core is increased through its use: all of the advantages available through the use of a perforated core (one having a plurality of holes/bores) are realized with the oblique column body embodiments, yet the primary thermal deficiency, namely convective heat transfer through the holes/bores, is greatly mitigated at least in portions of the resulting structure subject to compression loading.

In embodiments having plug members, the plug members need not occupy each hole/bore, but in certain embodiments do so. Plug members may be positioned anywhere within a hole/bore since occlusion between the two orifices defining the boundaries of the hole/bore is an objective. However, for manufacturing purposes, it may be desirable to have such plug members positioned near one or both major surfaces of a slab/core. Preferably, the plug members are formed from the material removed from the slab/core to form the holes/bores, but may also be waste material from other operations such as batting remnants and the like. Additionally, to retain the benefits of core weight, which is a principle reason for hole/bore creation, the plug member is preferably less dense than the slab core material and/or occupies less volume than the hole/bore into which it resides.

In other slab core embodiments, thermal convention heat transfer is mitigated by positioning a sheet material, such as a film, a thin foam material or a batting preferably constructed from polyester, over one or both major surfaces. If a final structure such as a self-inflating pad having tensile elements therein is desired, then it may be desirable to selectively apply or establish an adhesive or low melting point plastic to such sheet material. In this manner, the sheet material may be bonded or adhered to the slab/core, as well as any enveloping structure.

In many embodiments, the other form of heat transfer referenced above is addressed, in addition to or in lieu of convection transmission mitigation means. To address radiant heat transfer modes, the core may subjected to a surface treatment of a radiant reflecting material, e.g., vapor deposited aluminum, or a radiant barrier film may be associated with one or both major surfaces. Again, depending upon applications, it may be desirable to selectively apply or establish an adhesive or low melting point plastic to such film material, if such properties are not already inherent. Such films, which are well known in the industry, comprise an aluminized MYLAR or other form of polymeric film material having a highly thermally reflective coating on one or both sides thereof. If such films are positioned on both sides of a slab core, then provisions may be made for venting gas/fluid from the columns if the slab core is not sufficiently fluid/gas permeable. If the perimeter of the slab/core is exposed to the environment (e.g., it is not bonded to any impervious material) and if the slab core has intrinsic gas/fluid migration properties (e.g., open cell foam), then it is not necessary, although perhaps desirable, to perforate at least one film to permit appropriate gas/fluid escape and entry.

In addition to being associated with one or both major slab core surfaces, both convection and/or radiant transmission mitigation means can be disposed between two or more sub-slabs comprising a slab core. Again, because the purpose of the mitigation means is to interrupt heat transfer from one side of the slab/core to the other side, the precise position or location thereof is not critical to the desired performance of the core. Moreover, this form of thermal transmission mitigation means finds utility not only with normal holes/bores but also with oblique open or occluded holes/bores. In particular, film-based radiant barriers improve overall performance of any slab core configuration.

Slab core invention embodiments having at least two vertically associated (stacked) slabs comprising a slab core can also employ a hole/bore offset arrangement as a viable thermal transmission mitigation means for improving a core's resistance to heat transmission, particularly regarding convection transfer. In these embodiments, holes/bores in a first sub-slab are offset from holes/bores in a second sub-slab such that the path from one hole/bore orifice to another is occluded. In other words, the holes/bores are at least partially discontinuous through the section of the slab core, and thus retain the benefits of a perforated slab/core, yet mitigate thermal convection there through. As with other embodiments, this feature can be exploited in both normal hole/bore embodiments of the invention as well as oblique open or occluded forms.

The foregoing discussion concerned the constitution of slab and array cores. However, advantageous thermal mitigation can also be achieved through appropriate selection of materials for the envelope of an inflatable body, which constitutes a preferred exploitation of the cores of the invention. As stated previously, the envelope for an inflatable body using any of the core embodiments of the invention may be wholly, substantially, partially, or selectively bonded to the core either directly or indirectly, or may not be bonded thereto at all. As such, increased thermal performance (i.e., decreased thermal transmission from one side of the core to the other) can be achieved by integrating insulating materials into or treatment of the envelope material, particularly when the envelope is at least partially or selectively bonded to the core. Examples include convection and/or radiant barriers associated with the envelope material (either externally to be exposed to the environment or internally to be exposed to the core, or as an intermediate layer between a layer exposed to the environment and a layer presented to the core). Given the nature of the material comprising the envelope, preferred embodiments will include an envelope having a radiant barrier.

While many of the forgoing invention embodiments can be constructed by a practitioner having ordinary skill in the art without undue experimentation, cost effective construction techniques for slabs having oblique columns has been elusive. One solution has been to create normal holes/bores in a slab having a sectional thickness much greater than desired, and then removing a portion there from that has parallel opposing major surfaces and oblique columns. This solution, however, generates great waste and introduces other technical problems. Another solution has been to use oblique cutting tools. Again, however, specialized equipment is necessary and such techniques do not lend themselves to volume production.

A solution utilized in construction of invention embodiments having such a slab core uses tools intended for forming normal holes/bores. However, rather than simply applying the tools to a slab or orthogonally compressing the slab's major surfaces, an orthogonally compressed slab is subject to shear force. In other words, when such friction between two compression platens, for example, has been established, the platens are differentially shifted so as to induce sheer in the slab. At this point, the slab can be perforated in a direction orthogonal to the platens in order to establish the desired column frequency and pattern(s). Upon release of the platens, the slab resumes its resting geometry, but now defines a plurality of oblique columns. The degree of differential movement will determine the relative hole/bore orientation, including the creation of oblique occluded holes/bores.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

BRIEF DESCRIPTION OF THE DRAWINGS

FIG. 5 is a perspective view of an array core embodiment of the invention wherein a plurality of columnar solids are shown in registered opposition and a thermal transmission mitigation means in the form of a thermal barrier is disposed there between;

FIG. 10 is a cross section view taken substantially along the line 10-10 in FIG. 9 showing several of the holes/bores prior to compression loading;

FIG. 11 shows the cross section of FIG. 10 after subjected to compression loading in a direction orthogonal to the major surface of the slab core whereby the several holes/bores constitute a convection heat transmission mitigation means;

FIG. 12 is an exploded schematic view in perspective of a slab core disposed between an upper platen and a lower platen;

FIG. 13 shows the arrangement of FIG. 12 after platen compression of the slab core;

DESCRIPTION OF INVENTION EMBODIMENTS

Preface: The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show, but is to be accorded the widest scope consistent with the principles and features disclosed herein.

Figure 1:
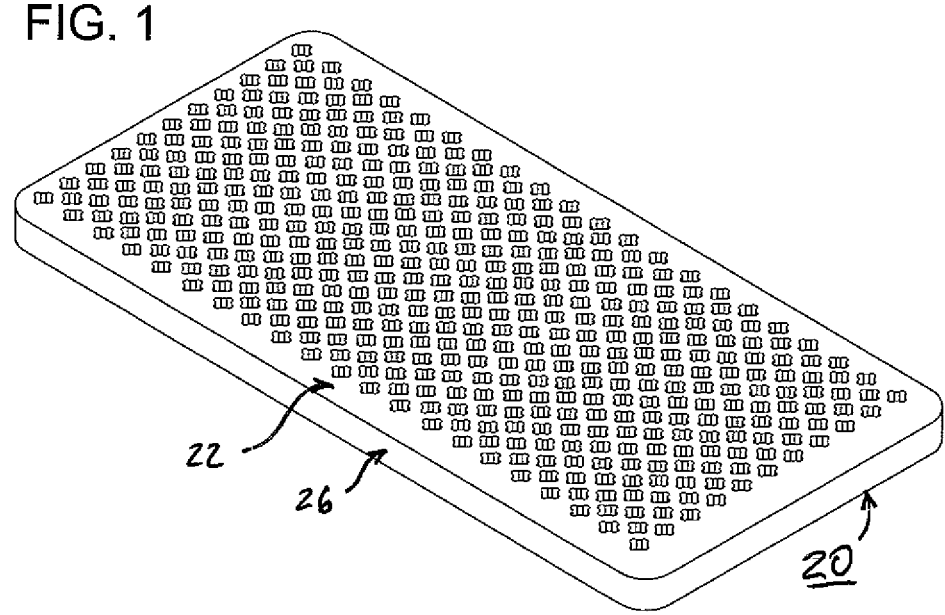
FIG. 1 is a perspective view of a conventional slab core wherein a plurality of open normal holes/bores extending from one major surface to an opposing major surface are defined by a slab of resilient material.
Figure 2:
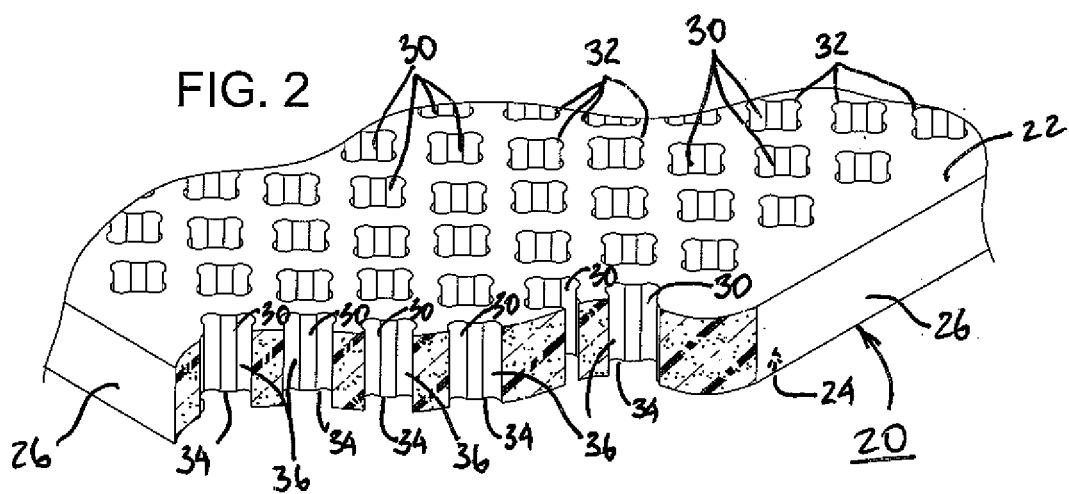
FIG. 2 is a detailed partial section view of the slab core of FIG. 1 illustrating unrestricted radiant and convection thermal transmission paths provided by normal holes/bores.

Turning then to the several drawings wherein like numerals indicate like parts, and more particularly to FIGS. 1 and 2, a conventional slab core is shown for reference. Slab core 20 is preferably formed from a resilient material, which is often an open cellular foam material and particularly an open cellular urethane foam. Slab core 20 has major surfaces 22 and 24 (for convention, major surface 22 may also be described herein as "lower major surface 22" and major surface 24 may also be described herein as "upper major surface 24"; major surface 24 is not shown in the perspective views but is necessarily present and is referenced for completeness), as well as perimeter surface 26. Slab core 20 further defines a plurality of holes/bores 30, which are generally bounded by orifices 32 and 34 (orifices 34 are not shown as they are present on major surface 24), and by wall 36. Each hole/bore 30 has a geometric cross section.

As particularly illustrated in FIG. 2, holes/bores 30 have a major axis that is generally orthogonal to both major surfaces 22 and 24, and are therefore styled as "normal holes/bores". Also as particularly illustrated in FIG. 2 is the lack of any thermal transmission mitigation means to affect the rate of radiant or convection heat transfer between major surfaces 22 and 24. Thus, while creating a less dense slab core, introduction of normal holes/bores 30 decreases the innate insulative property of the slab core.

Figure 3:
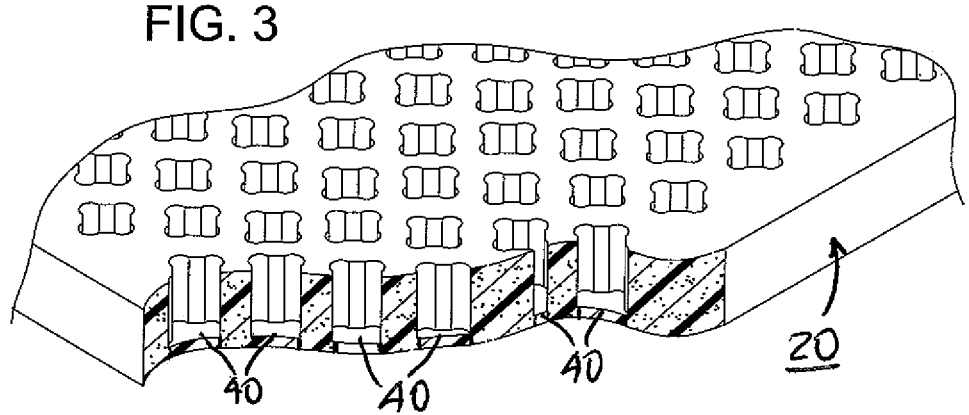
FIG. 3 shows the slab core of FIGS. 1 and 2 after incorporation of a thermal transmission mitigation means in the form of discrete plug members disposed in at least some of the normal holes/bores, according to an embodiment of the invention.

A first illustrated solution to undesired loss of insulative properties in such slab cores is shown in FIG. 3 wherein a plurality of plug elements 40 are introduced into, or are retained in during formation of, at least some of holes/bores 30. Whether derived from intrinsic or extrinsic material, whether linked to a common substrate or discrete in nature, plug elements 40 are disposed between opposing major surfaces 22 and 24 to limit convective and/or radiant heat transfer there between. The skilled practitioner will appreciate that material selection for plug elements 40 will affect insulative performance of the slab as well as weight. Therefore, the balance between these two factors will at least partially drive the material selection process.

Figure 4:
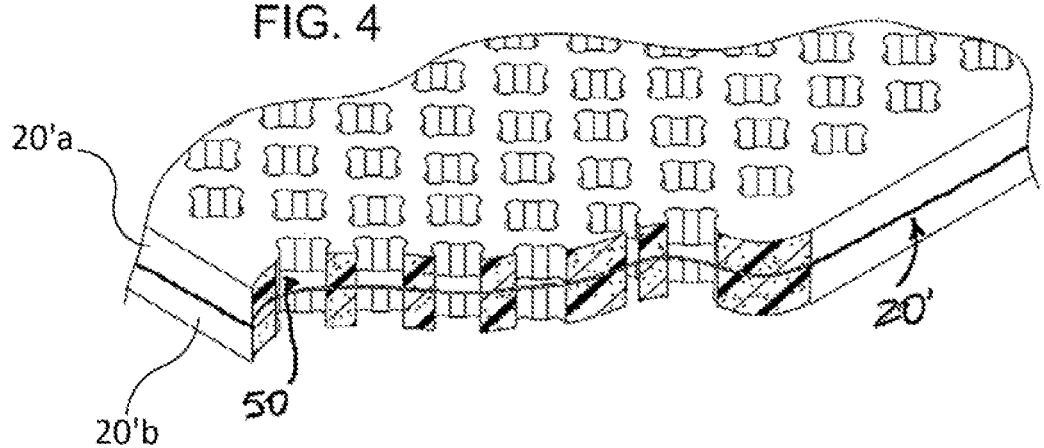
FIG. 4 illustrates a variation of the slab core of FIGS. 1 and 2 wherein the slab comprises two sub-slabs and wherein a thermal transmission mitigation means in the form of a thermal barrier is disposed there between, according to an embodiment of the invention.

A second illustrated solution to undesired loss of insulative properties in such slab cores is shown in FIG. 4 wherein thermal barrier 50 is disposed between two sub-slabs 20'a and 20'b, which combined form slab core 20'. Thermal barrier 50 again may comprise any material intended for its purpose. Thus, many embodiments within this solution will use radiantly reflective batting such as aluminized MYLAR (a film material) or polyester batting (generally a spun material) so that both radiant and convection heat transfers modes will be beneficially affected. Alternatively or additionally, thermal barrier 50 may be disposed on either or both major surfaces 22 and 24, again with consideration being given to the competing objectives of decreasing slab core weight and improving thermal performance. Thermal performance can further be increased in multi sub-slab embodiments by offsetting holes/bores 30 in addition to integrating thermal barrier 50 therein.

Figure 5:
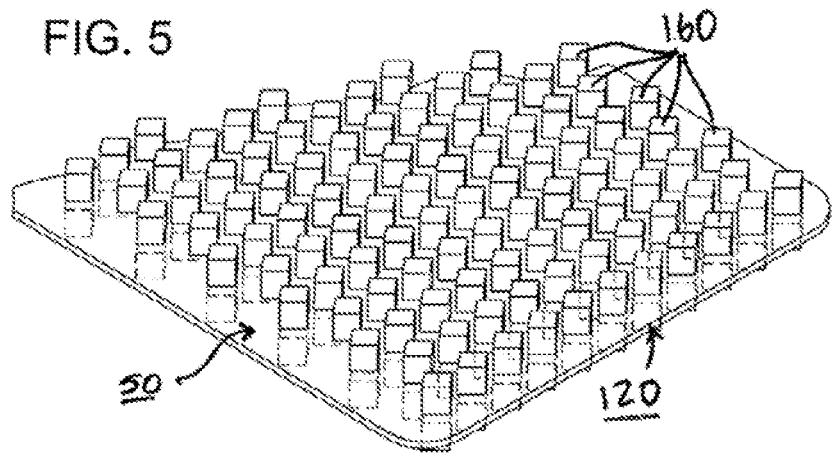

Thermal barrier 50 can also be used as a substrate for columnar solids 160 to create array core 120, as best shown in FIG. 5. Here, both sides of barrier 50 have solids 160 associated there with, preferably being mechanically linked thereto such as by adhesive or similar means.

Figure 6:
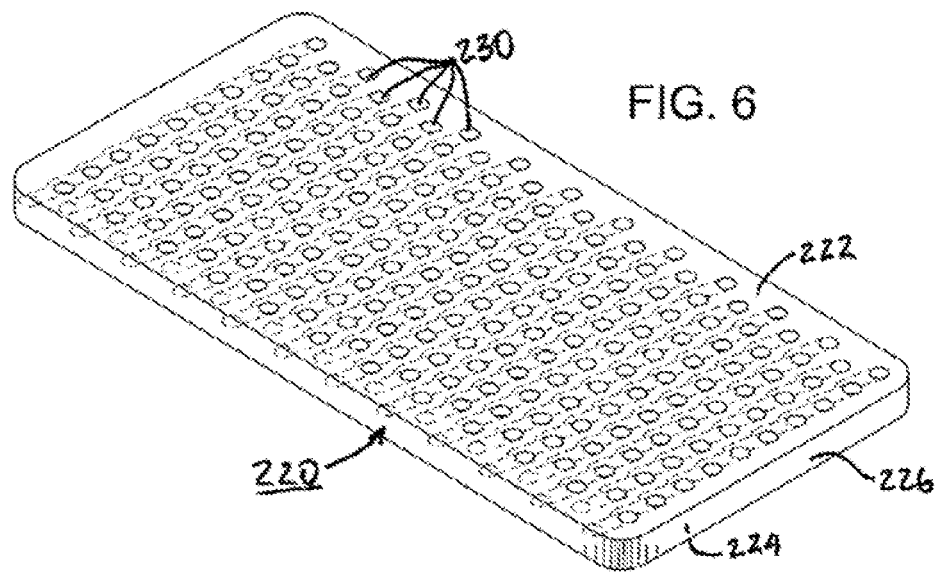
FIG. 6 is a perspective view of a slab core embodiment of the invention wherein a plurality of occluded oblique holes/bores extend from one major surface to an opposing major surface of a slab of resilient material to constitute a thermal transmission mitigation means.
Figure 7:
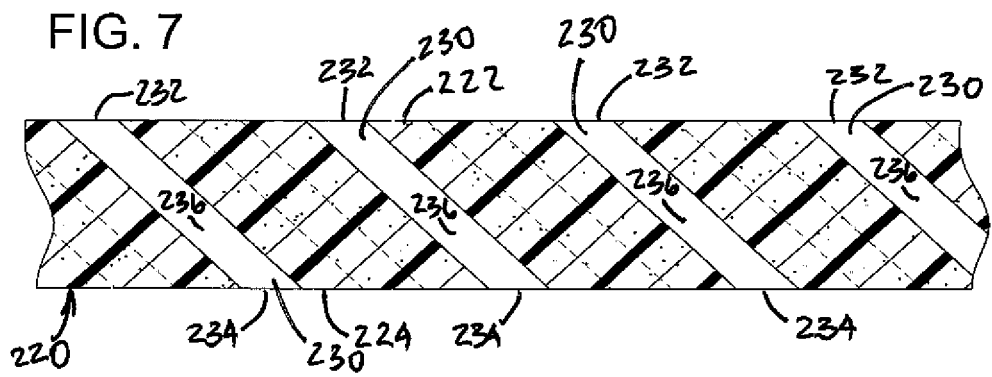
FIG. 7 is a detailed partial section view of the slab core of FIG. 6 illustrating the occluded nature of the oblique holes/bores, thus constituting a radiant heat transmission mitigation means.
Figure 8:
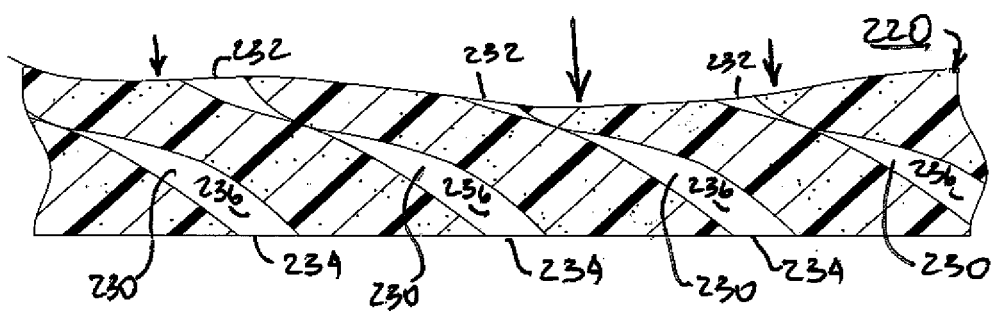
FIG. 8 shows the section view of FIG. 7 after the slab core is subjected to an orthogonal compressive load, thereby collapsing at least some occluded oblique holes/bores and constituting a convection heat transmission mitigation means.

In addition to adding material to a slab core 20/20' as a form of thermal transfer mitigation means, slab core 20 can be treated. Treatment can comprise application of chemicals or other substances, or can comprise modification of the hole/bore parameters. As best shown in FIGS. 6-8, oblique occluded holes/bores 230 can be formed in slab core 220. Such holes/bores intrinsically mitigate radiant heat transfer, which is linear and nearly always orthogonal to one or both major surfaces 222, 224: the radiation entering an orifice 232, 234 will necessarily impinge upon a hole/bore wall 236. However, there still exists an effective fluid path between orifices 232 and 234, which is conducive to convection heat transfer.

A feature of many oblique holes/bores, whether open or occluded, is their tendency to collapse during off axis compression, as best shown in FIG. 8. When in a collapsed state, the previously open fluid pathway defined by walls 236 is now obstructed, thereby significantly reducing heat transfer via convection, and greatly improving thermal performance of the slab core, without the addition of any intrinsic or extrinsic material. Because in many applications such as inflatable padding thermal performance is only of issue when such articles are undergoing compression, the selective closure of such convection pathways is not detrimental.

Figure 9:
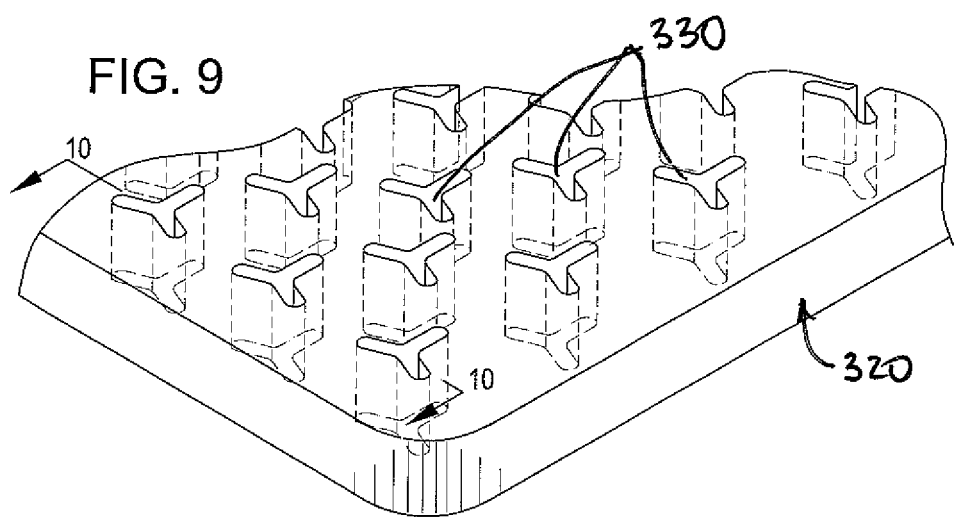
FIG. 9 is a perspective view of a slab core embodiment of the invention wherein a thermal transmission mitigation means in the form of a plurality of open normal holes/bores extend from one major surface to an opposing major surface of a slab of resilient material and have purposely selected geometric cross sections to decrease the force necessary to achieve compression collapse of the same.
Figure 14:
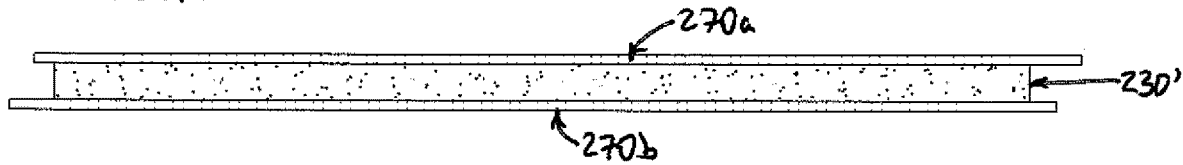
FIG. 14 is a representative side elevation view of the arrangement shown in FIG. 13.
Figure 15:
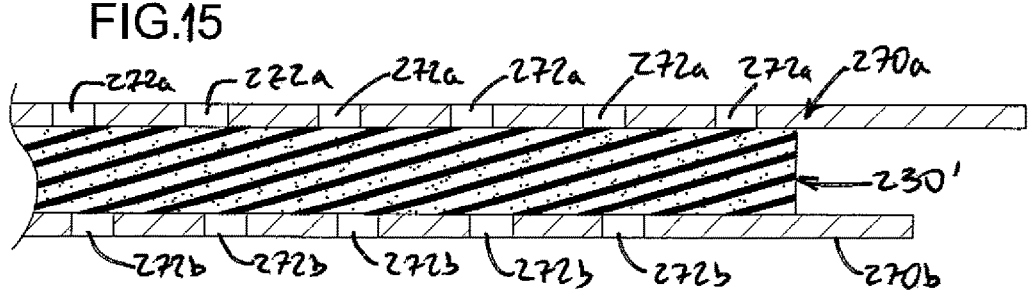
FIG. 15 is a detailed partial cross section view of the arrangement shown in FIG. 14.

While oblique holes/bores are considered desirable, normal holes/bores can be created to include similar functionality, albeit with perhaps reduced performance. FIGS. 9-11 demonstrate a similar hole/bore collapse strategy whereby normal holes/bores 330 are formed in slab core 320, and undergo compressive collapse to thereby obstruct the previously open fluid pathway defined by walls 336. The skilled practitioner will appreciate that intelligent selection of the geometric cross section of any given hole/bore and awareness of hole/bore density within the slab core will affect the force necessary to achieve collapse as well as the reduction in slab core weight.

Figure 16:
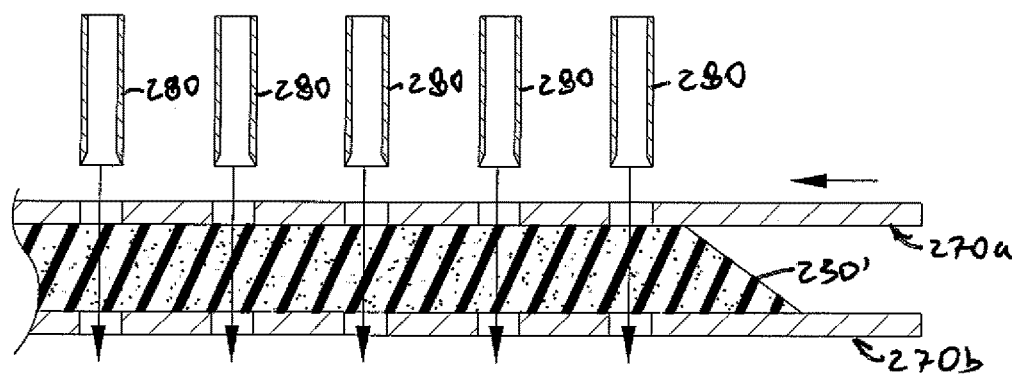
FIG. 16 shows the lateral movement of an upper platen in compressive contact with the slab core to induce shear therein, and the application of die elements to create holes/bores therein.
Figure 17:
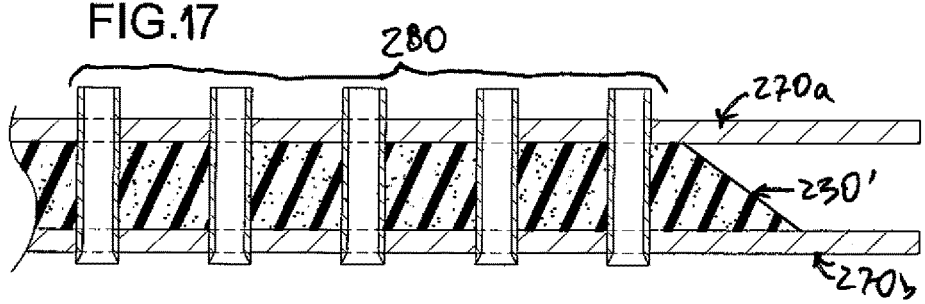
FIG. 17 shows the die elements of FIG. 16 fully extended into the slab core.
Figure 18:
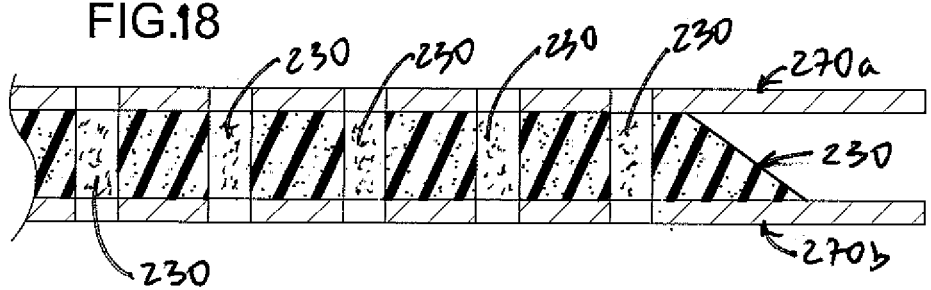
FIG. 18 shows the arrangement of FIG. 17 after removal of the die elements.
Figure 19:
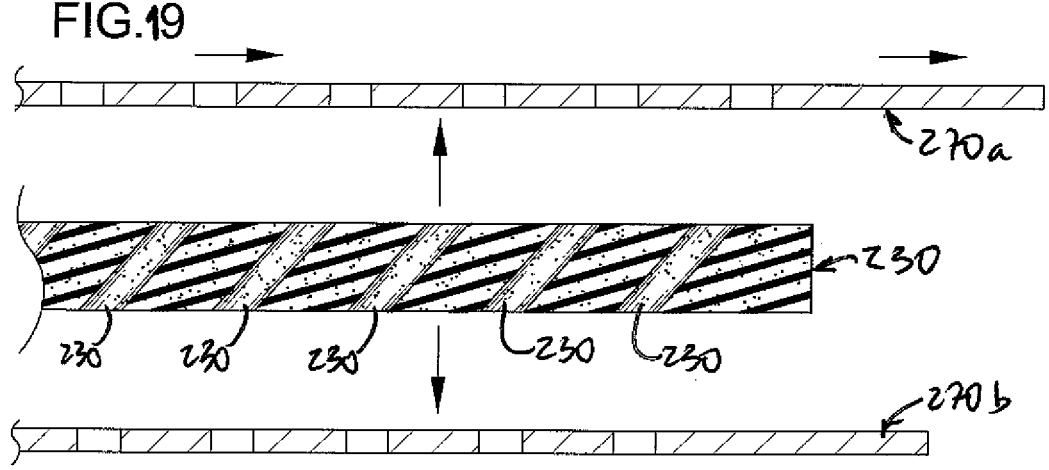
FIG. 19 shows the arrangement of FIG. 18 after disengagement of the platens and restoration of the original form of the slab core, which now possess occluded oblique holes/bores.

Turning next to FIGS. 12-19, a method for creating slab core 220 is illustrated. A solid slab 230' is positioned between two foraminous platens 270a and 270b (FIG. 12) and compressed thereby (FIGS. 13-15) with sufficient force to generate a coefficient of friction sufficient to permit slab 230' to undergo shear as best shown in FIG. 16. At such time, die elements 280 enter through holes 272a in platen 270a, perforate slab 230' and partially exit through holes 272b in platen 270*b*, as is shown in FIG. 17. Upon withdrawal of die elements 280 (FIG. 18) and decompression of platens 270*a* and 270*b* (FIG. 19), the shear force is removed from slab 230, which reverts to its original configuration. The resulting slab 230 now possesses oblique holes/bores 230 that were created by non-obliquely aligned tools.

What is claimed:

1. A resilient core of material, comprising:
a mechanically unitary slab having:
a first major surface,
a second major surface in general opposing relationship to the first major surface,
a common perimeter surface joining the two major surfaces,
a plurality of inner opposing walls defining a plurality of bores formed through the two major surfaces, each bore having an axis oriented at an oblique angle relative to the two major surfaces, wherein, in the absence of a force applied to the slab, no walls of the bore contact each other.

2. The resilient core of claim 1, wherein the inner opposing walls are configured to collapse upon each other in response to pressure applied to at least one of the two major surfaces.

3. The resilient core of claim 1, wherein all of the bores are oriented parallel to one another.

4. A mattress comprising:
a mechanically unitary slab having a first major surface in general opposing relationship to a second major surface, with a common perimeter surface joining the two major surfaces;
a plurality of inner opposing walls defining a plurality of bores formed through the slab wherein each bore has an orientation at an oblique angle relative to at least one major surface that is defined by an axis and a geometric cross section, wherein a wall of each bore is oriented substantially parallel to at least one wall of all the other bores;
a thermal barrier configured to reduce convective heat transfer; and
fluid impervious sheet material surrounding the resilient core to substantially envelope the same, thereby forming a fluid impervious envelope.

5. The mattress of claim 4, wherein the inner opposing walls are configured to collapse upon each other in response to pressure applied to at least one of the two major surfaces.

6. A resilient core of material comprising:
a mechanically unitary slab having a first major surface in general opposing relationship to a second major surface, with a common perimeter surface joining the two major surfaces; and
a plurality of inner opposing walls defining a plurality of bores formed through the slab wherein each bore has an orientation at an oblique angle relative to at least one major surface, wherein a wall of each bore is oriented substantially parallel to at least one wall of all the other bores.

7. The resilient core of claim 6, wherein the inner opposing walls are configured to collapse upon each other in response to pressure applied to at least one of the two major surfaces.

* * * * *